US012754838B2

(12) United States Patent
Schatzl et al.

(10) Patent No.: US 12,754,838 B2
(45) Date of Patent: Oct. 6, 2026

(54) GARBAGE COLLECTION USING DETAIL CARD TABLES

(71) Applicant: Oracle International Corporation, Redwood Shores, CA (US)

(72) Inventors: Thomas Schatzl, Linz (AU); Albert Mingkun Yang, Uppsala (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/069,079

(22) Filed: Mar. 3, 2025

(65) Prior Publication Data

US 2026/0259826 A1 Sep. 3, 2026

(51) Int. Cl.
*G06F 12/02* (2006.01)

(52) U.S. Cl.
CPC ...... *G06F 12/0276* (2013.01); *G06F 12/0292* (2013.01)

(58) Field of Classification Search
CPC .................................................. G06F 12/0276
See application file for complete search history.

(56) References Cited

U.S. PATENT DOCUMENTS 7,565,499 B1 * 7/2009 Garthwaite ......... G06F 12/0276 711/159
12,147,336 B1 * 11/2024 Nilsen ................ G06F 12/0253
2005/0235120 A1 * 10/2005 Dussud ............... G06F 12/0276 711/E12.012
2009/0089345 A1 * 4/2009 Daynes ............... G06F 12/0261
2012/0310998 A1 * 12/2012 Burka ................. G06F 9/45504 707/813
2013/0318132 A1 * 11/2013 Basu .................. G06F 12/0276 707/816

OTHER PUBLICATIONS

Detlefs et al., "Garbage-First Garbage Collection", ISMM'04, Oct. 24-25, 2004, pp. 37-48.
Holzle U., "A Fast Write Barrier for Generational Garbage Collectors", OOPSLA'93 Garbage Collection Works, Oct. 1993, pp. 1-6.
Wilson et al., A "Card-Marking Scheme for Controlling Intergenerational References in Generation-Based Garbage Collection on Stock Hardware", ACM SIGPLAN Notices, May 1989, vol. 24, No. 5, pp. 87-92.

* cited by examiner

*Primary Examiner* — Edward J Dudek, Jr.
(74) *Attorney, Agent, or Firm* — Invoke

(57) ABSTRACT

Techniques for garbage collection using detail cards are disclosed. A card in a card table and a detail card in a detail card table are associated with a heap segment. Bits in the detail card are associated, respectively, with heap subsegments of the heap segment. A garbage collector marks a first bit in the detail card as dirty. During a sweep cycle, the garbage collector determines that the card is clean, the first bit is dirty, and a second bit in the detail card is clean. During the sweep cycle, based on the card being clean, the first bit being dirty, and the second bit being clean, the garbage collector (a) scans a heap subsegment associated with the first bit for intergenerational references and (b) refrains from scanning a heap subsegment associated with the second bit for intergenerational references.

20 Claims, 10 Drawing Sheets

GARBAGE COLLECTION USING DETAIL CARD TABLES

TECHNICAL FIELD

The present disclosure relates to memory management. In particular, the present disclosure relates to garbage collection.

BACKGROUND

A runtime environment manages heap memory occupied by objects, i.e., runtime instances of types. An object is "reachable" in memory if it is accessible from the root object via a chain of one or more references. Garbage collection frees memory occupied by objects that are no longer reachable.

A generational garbage collector logically divides heap memory into multiple "generations" and stores objects in the generations based on their respective ages. An object's age may be measured, for example, as the number of minor garbage collection cycles the object has survived. A new object is allocated to the youngest generation. When the object survives a threshold number of minor garbage collection cycles, the garbage collector promotes the object to an older generation. Because objects in older generations are less likely to become unreachable, the garbage collector sweeps older generations less frequently.

During an evacuation process, a garbage collector evacuates (or "promotes") live objects from a younger generation to an older generation, freeing up space in the younger generation. Evacuating objects from one generation to another generation may also reduce memory fragmentation. A set of objects being evacuated may be referred to as a "collection set." A set of intergenerational references pointing to objects in a younger generation may be referred to as the younger generation's "remembered set." During evacuation, the garbage collector updates references in the remembered set to reflect the objects' new locations in the older generation.

Card marking garbage collectors implement remembered sets as a card table that includes cards corresponding to respective heap segments. The card table tracks heap segments that may include intergenerational references. The increment of memory covered by each card may be, for example, in the range of hundreds to low thousands of bytes (e.g., 128-1024 bytes). When writing data to a location covered by a particular card, a mutator (e.g., an application thread) marks or "dirties" that card. During a sweep cycle, the garbage collector identifies dirty cards and scans the corresponding heap segments for intergenerational references.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
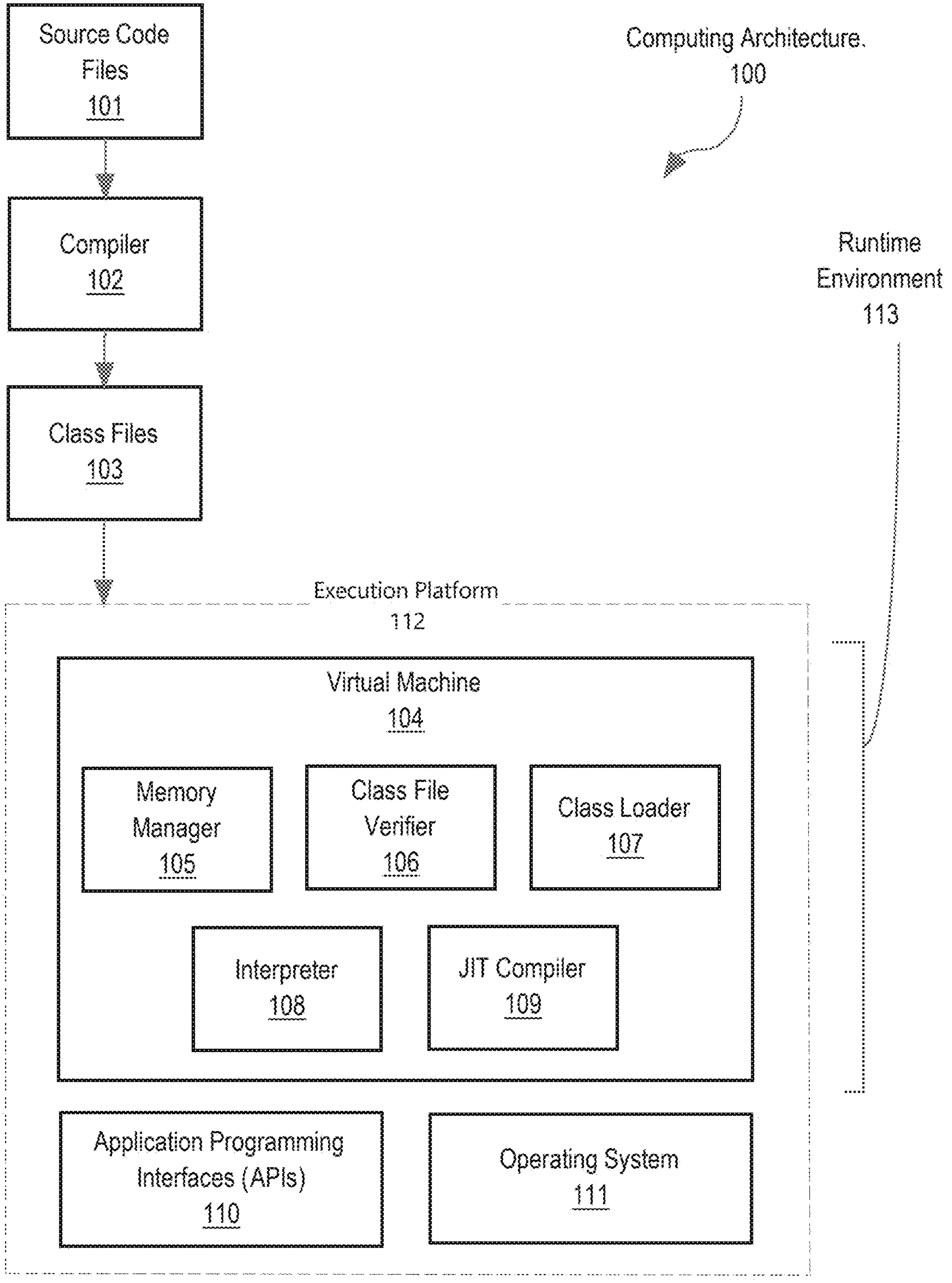
FIG. 1 illustrates an example computing architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. SYSTEM ARCHITECTURE
5. CONCURRENT REFINEMENT
6. SWEEP CYCLE
7. COMPUTER NETWORKS AND CLOUD NETWORKS
8. HARDWARE OVERVIEW
9. MISCELLANEOUS; EXTENSIONS

1. GENERAL OVERVIEW

One or more embodiments improve the performance of card marking garbage collectors. In addition to a card table, one or more embodiments maintain a detail card table. Detail cards in the detail card table are associated with the same heap segments as corresponding cards in the card table. For a particular card associated with a heap segment, the corresponding detail card includes bits associated with respective subsegments of that heap segment. For example, if a card is associated with a 512-byte heap segment, a corresponding detail card may include 8 bits associated with respective 64-byte heap subsegments. A dirty bit in a detail card indicates that the corresponding heap subsegment may include an intergenerational reference.

One or more embodiments use concurrent refinement to manage detail cards. Specifically, one or more concurrent refinement threads update detail cards while executing concurrently with one or more mutator threads. In an embodiment, concurrent refinement identifies dirty cards and scans the corresponding heap segments for intergenerational references. If a heap segment includes an intergenerational reference, concurrent refinement dirties the corresponding bit in the detail card.

During a sweep cycle, one or more embodiments examine the card table to identify dirty cards. If a card is dirty, the garbage collector scans the corresponding heap segment for intergenerational references. If the card is not dirty and the corresponding detail card includes any dirty bits, the garbage collector scans the heap subsegment(s) associated with the dirty bit(s) for intergenerational references. If scanning identifies an intergenerational reference to an object in the collection set, the garbage collector updates the reference to reflect the object's new location.

One or more embodiments reduce the computational resources needed to scan the heap for intergenerational references during garbage collection. When a card is clean and the corresponding detail card includes at least one dirty bit, the garbage collector selectively scans the heap subsegment(s) associated with the dirty bit(s). For example, if a detail card includes eight bits and only one of those bits is dirty, the computational resources needed to scan only one heap subsegment are approximately one eighth of the computational resources needed to scan the entire heap segment. The resources spared by this approach are available for other threads (e.g., application threads, operating system services, etc.). Thus, reducing the overhead associated with garbage collection improves the functioning of the computer system overall.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that include code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 include the virtual machine instructions that have been converted from the source code files 101. However, in other embodiments, the class files 103 may include other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may include one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
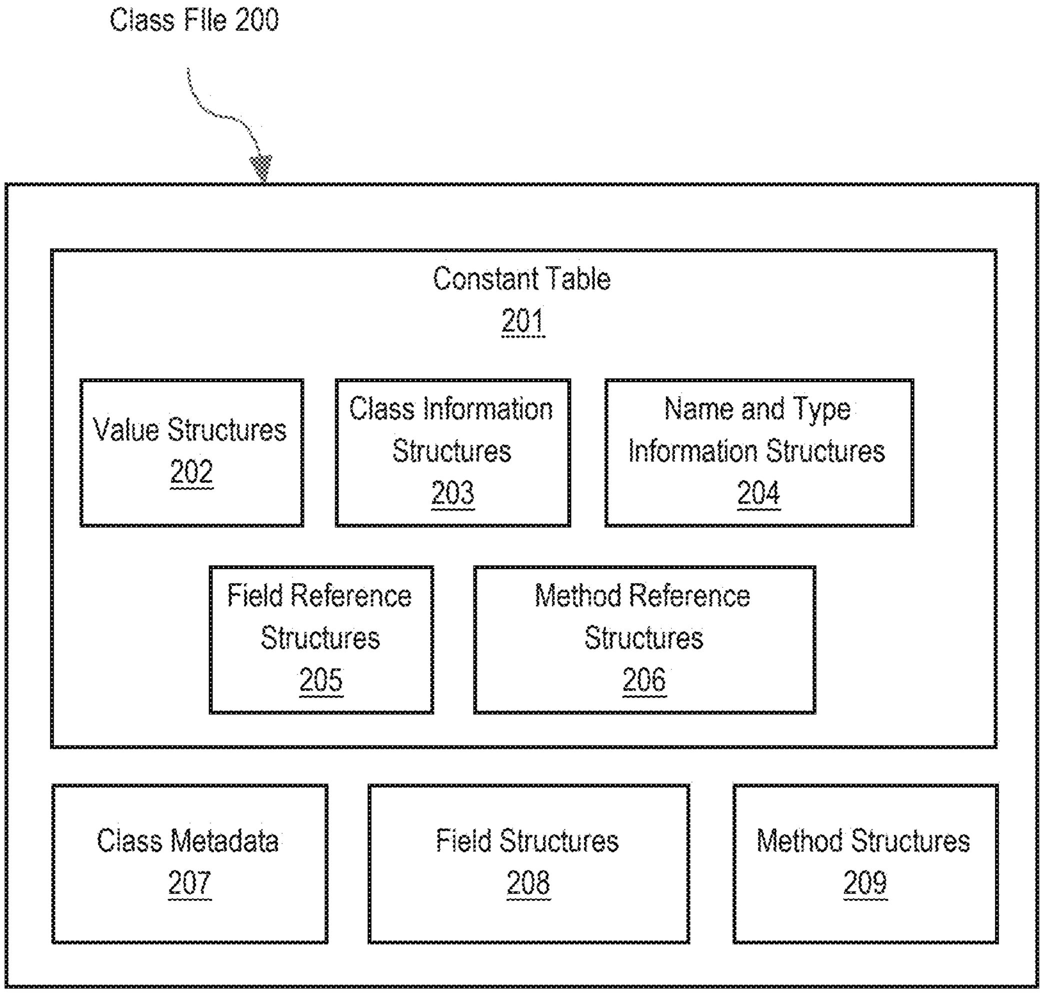
FIG. 2 illustrates one embodiment of a computer system in accordance with one or more embodiments.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
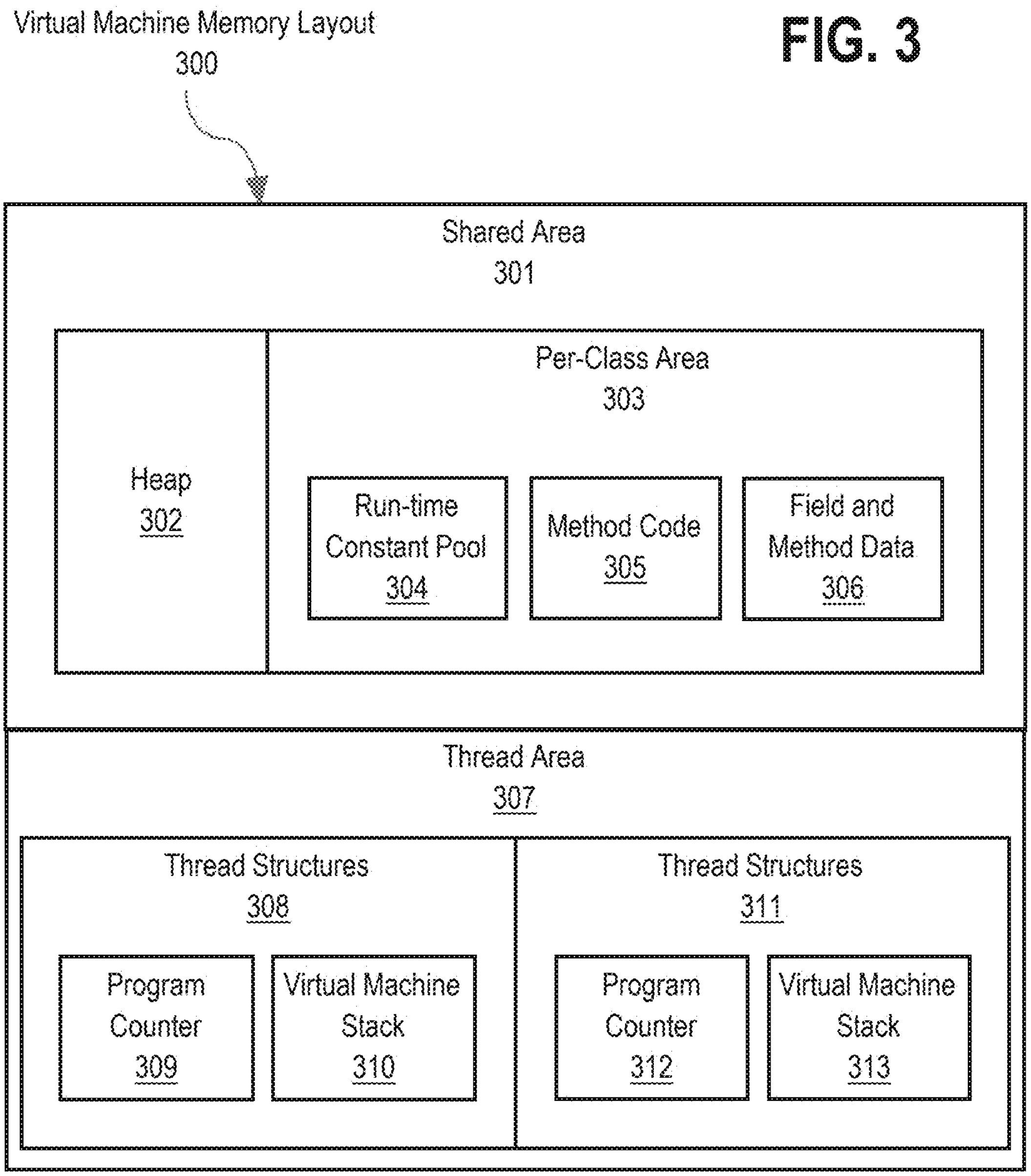
FIG. 3 illustrates an example virtual machine memory layout in block diagram form in accordance with one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
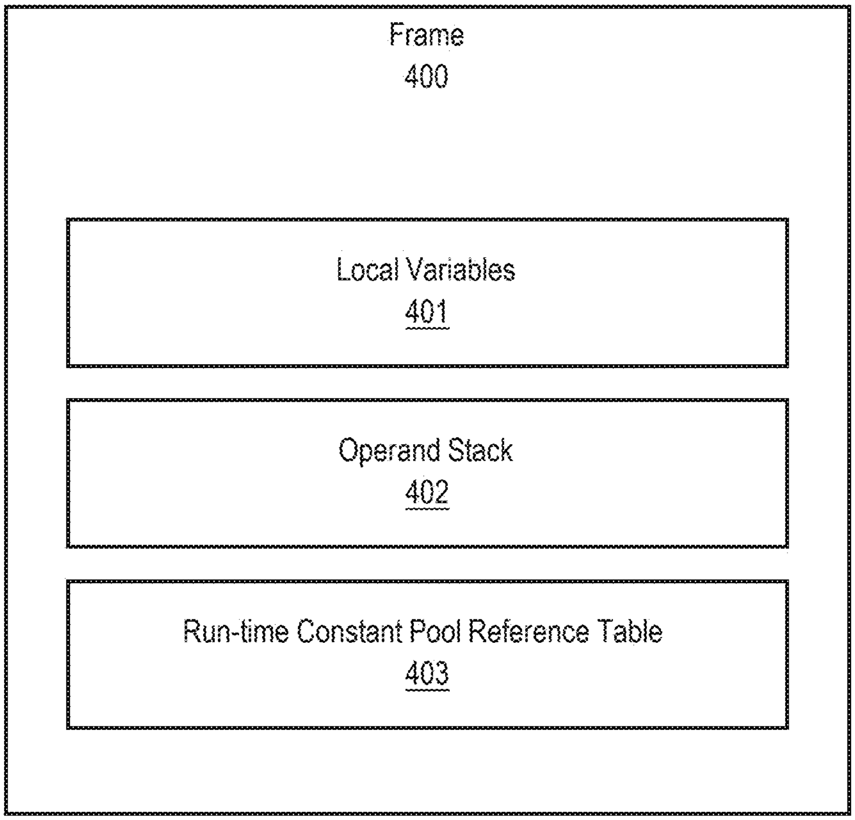
FIG. 4 illustrates an example frame in block diagram form in accordance with one or more embodiments.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 includes a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A includes a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. GARBAGE COLLECTION

Figure 5:
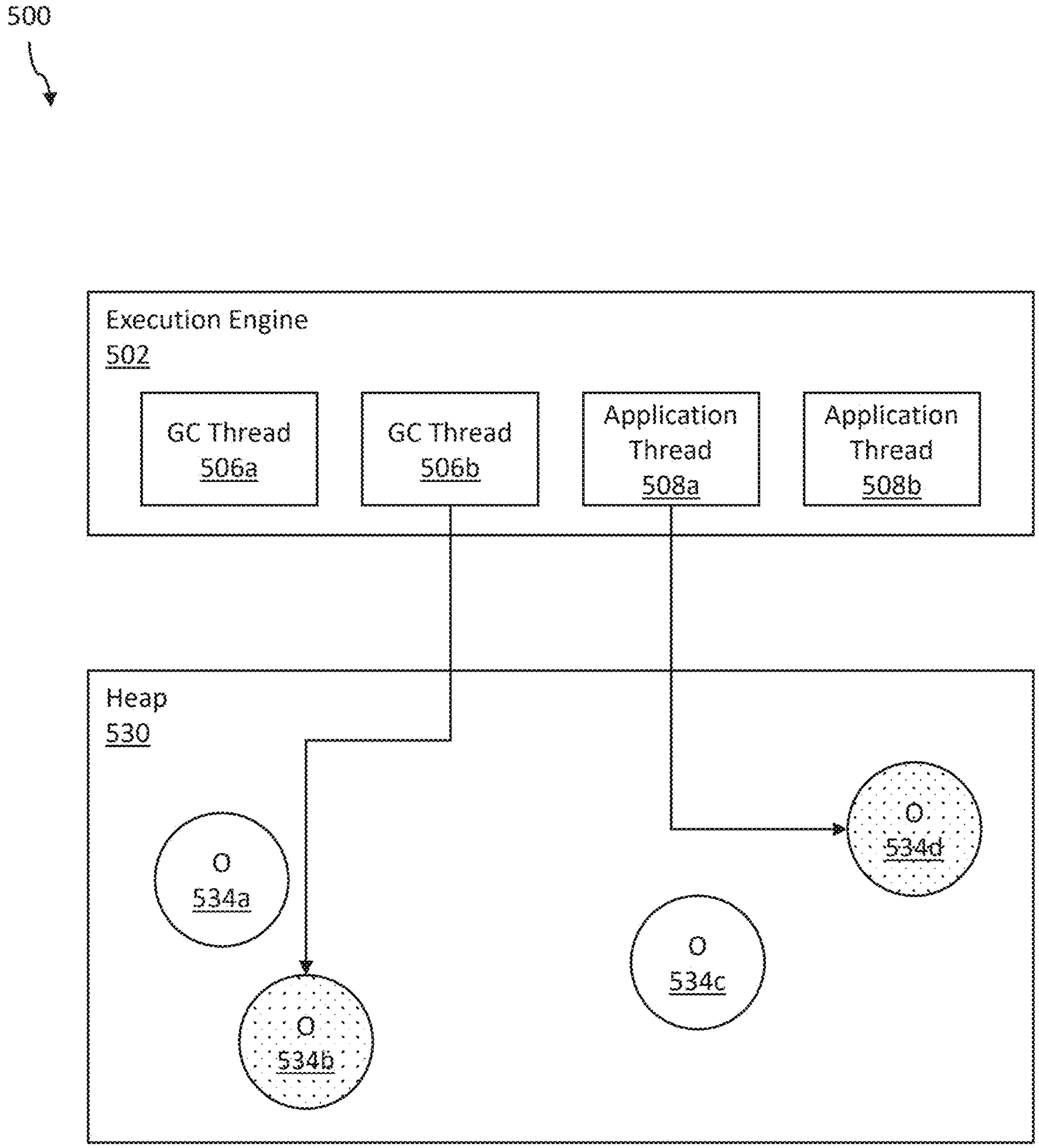
FIG. 5 illustrates an execution engine and a heap memory of a virtual machine in accordance with one or more embodiments.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534*a-d* that are created during execution of an application. An object stored in a heap 530 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534*b*, 534*d* (indicated by the dotted pattern) and unused objects 534*a*, 534*c* (also referred to as "dead objects," indicated by the blank pattern). An unused object is an object that is no longer being used by any application. A live object is an object that is still being used by at least one application. An object is still being used by an application if the object is (a) pointed to by a root reference or (b) traceable from another object that is pointed to by a root reference. A first object is "traceable" from a second object if a reference to the first object is included in the second object.

Sample code may include the following:

```
class Person {
  public String name;
  public int age;
  public static void main(String [ ] args){
    Person temp=new Person( );
    temp. name="Sean";
    temp. age=3;
  }
}
```

An application thread 508*a* executing the above sample code creates an object temp in a heap 530. The object temp is of the type Person and includes two fields. Since the field age is an integer, the portion of the heap 530 that is allocated for temp directly stores the value "3" for the field age. Since the field name is a string, the portion of the heap 530 that is allocated for temp does not directly store the value for the name field; rather the portion of the heap 530 that is allocated for temp stores a reference to another object of the type String. The String object stores the value "Sean." The String object is referred to as being "traceable" from the Person object.

In one or more embodiments, an execution engine 502 includes one or more threads configured to execute various operations. As illustrated, for example, an execution engine 502 includes garbage collection (GC) threads 506*a-b* and application threads 508*a-b*.

In one or more embodiments, an application thread 508*a-b* is configured to perform operations of one or more applications. An application thread 508*a-b* creates objects during run-time, which are stored onto a heap 530. An application thread 508*a-b* may also be referred to as a "mutator," because an application thread 508*a-b* may mutate the heap 530 (during concurrent phases of GC cycles and/or between GC cycles).

In one or more embodiments, a GC thread 506*a-b* is configured to perform garbage collection. A GC thread 506*a-b* may iteratively perform GC cycles based on a schedule and/or an event trigger (such as when a threshold allocation of a heap (or region thereof) is reached). A GC cycle includes a set of GC operations for reclaiming memory locations in a heap that are occupied by unused objects.

In an embodiment, multiple GC threads 504*a-b* may perform GC operations in parallel. The multiple GC threads 506*a-b* working in parallel may be referred to as a "parallel collector."

In an embodiment, GC threads 506*a-b* may perform at least some GC operations concurrently with the execution of application threads 508*a-b*. The GC threads 504*a-b* that operate concurrently with application threads 508*a-b* may be referred to as a "concurrent collector" or "partially-concurrent collector."

In an embodiment, GC threads 506*a-b* may perform generational garbage collection. A heap is separated into different regions. A first region (which may be referred to as a "young generation space") stores objects that have not yet satisfied criteria for being promoted from the first region to a second region; a second region (which may be referred to as an "old generation space") stores objects that have satisfied the criteria for being promoted from the first region to the second region. For example, when a live object survives at least a threshold number of GC cycles, the live object is promoted from the young generation space to the old generation space.

Various different GC processes for performing garbage collection achieve different memory efficiencies, time efficiencies, and/or resource efficiencies. In an embodiment, different GC processes may be performed for different heap regions. As an example, a heap may include a young generation space and an old generation space. One type of GC process may be performed for the young generations space. A different type of GC process may be performed for the old generation space. Examples of different GC processes are described below.

As a first example, a copying collector involves at least two separately defined address spaces of a heap, referred to as a "from-space" and a "to-space." A copying collector identifies live objects stored within an area defined as a from-space. The copying collector copies the live objects to another area defined as a to-space. After all live objects are identified and copied, the area defined as the from-space is reclaimed. New memory allocation may begin at the first location of the original from-space.

Copying may be done with at least three different regions within a heap: an Eden space, and two survivor spaces, S1 and S2. Objects are initially allocated in the Eden space. A GC cycle is triggered when the Eden space is full. Live objects are copied from the Eden space to one of the survivor spaces, for example, S1. At the next GC cycle, live objects in the Eden space are copied to the other survivor space, which would be S2. Additionally, live objects in S1 are also copied to S2.

As another example, a mark-and-sweep collector separates GC operations into at least two stages: a mark stage and a sweep stage. During the mark stage, a mark-and-sweep collector marks each live object with a "live" bit. The live bit may be, for example, a bit within an object header of the live object. During the sweep stage, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

A mark-and-sweep collector may be implemented as a parallel collector. Additionally or alternatively, a mark-and-sweep collector may be implemented as a concurrent collector. Example phases within a GC cycle of a concurrent mark-and-sweep collector include:

Phase 1: Identify the objects referenced by root references (this is not concurrent with an executing application).

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Sweep the heap to obtain free lists and reclaim memory (this may be concurrent)

As another example, a compacting collector attempts to compact reclaimed memory areas. A heap is partitioned into a set of equally sized heap regions, each a contiguous range of virtual memory. A compacting collector performs a concurrent global marking phase to determine the liveness of objects throughout the heap. After the marking phase completes, the compacting collector identifies regions that are mostly empty. The compacting collector collects these regions first, which often yields a large amount of free space. The compacting collector concentrates its collection and compaction activity on the areas of the heap that are likely to be full of reclaimable objects, that is, garbage. The compacting collector copies live objects from one or more regions of the heap to a single region on the heap, and in the process both compacts and frees up memory. This evacuation may be performed in parallel on multiprocessors to decrease pause times and increase throughput.

Example phases within a GC cycle of a concurrent compacting collector include:

Phase 1: Identify the objects referenced by root references (this is not concurrent with an executing application)

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Copy live objects from a source region to a destination region, to thereby reclaim the memory space of the source region (this is not concurrent)

Additional and/or alternative types of GC processes, other than those described above, may be used.

4. SYSTEM ARCHITECTURE

Figure 6:
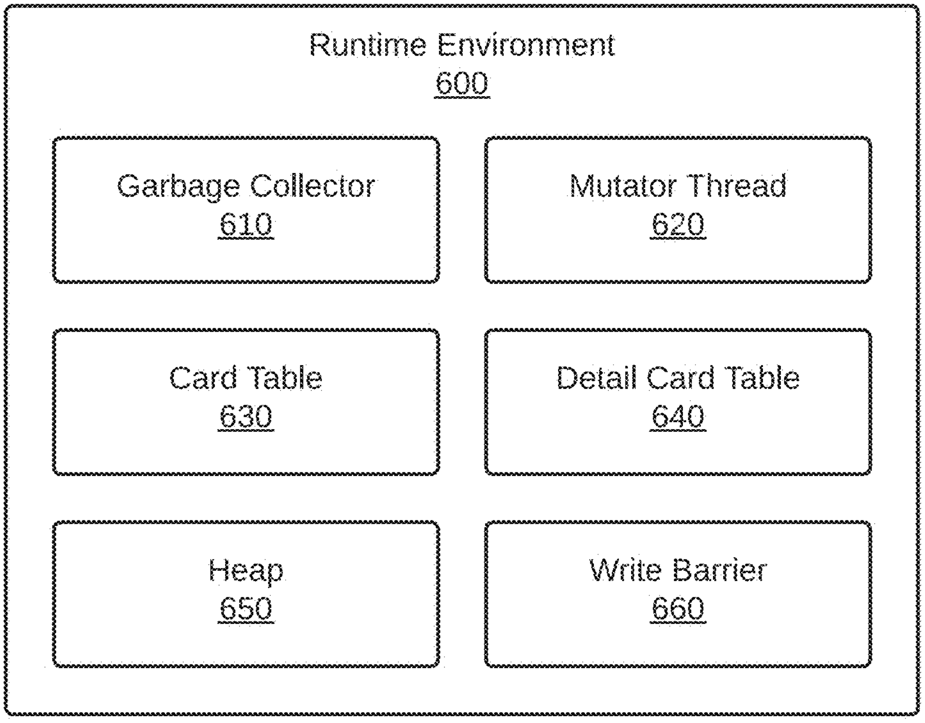
FIG. 6 illustrates a runtime environment of a computer system in accordance with one or more embodiments.

FIG. 6 illustrates a runtime environment 600 of a computer system in accordance with one or more embodiments. In an embodiment, the runtime environment 600 includes the runtime environment 113 of FIG. 1. However, other implementations of the runtime environment 600 are also within the scope of the present disclosure.

As illustrated in FIG. 6, in some embodiments, runtime environment 600 includes garbage collector 610, mutator thread 620, card table 630, detail card table 640, heap 650, and write barrier 660. The runtime environment 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

The components illustrated in FIG. 6 may communicate with one another via one or more computer networks. Furthermore, one or more components illustrated in FIG. 6 may be implemented as part of a cloud network. Additional embodiments and/or examples relating to computer networks are described below in Section 6, titled "Computer Networks and Cloud Networks."

In one or more embodiments, the garbage collector 610 is configured to perform garbage collection on the heap 650. For example, the garbage collector 610 may be configured to execute one or more garbage collection threads such as GC threads 506*a-b* discussed above with respect to FIG. 5. The garbage collector 610 may be a card marking generational garbage collector.

In some embodiments, the heap 650 stores objects that are created during execution of the mutator thread 620. In an embodiment, the heap includes the heap 530 discussed above with respect to FIG. 5. However, other configurations of the heap 530 are also within the scope of the present disclosure.

In one or more embodiments, the mutator thread 620 may be any kind of thread configured to write data to the heap 650. For example, the mutator thread 620 may be associated with a software application, service, and/or another kind of software. For example, the mutator thread 620 may be an application thread such as application threads 508*a-b* discussed above with respect to FIG. 5.

In an embodiment, the write barrier 660 is executed when the mutator thread 620 writes to the heap 650. Specifically, when the mutator thread 620 writes data to a location in a heap segment, the write barrier 660 dirties the corresponding card in the card table 630.

In some embodiments, the card table 630 indicates heap segments that may store intergenerational references in the heap 650. For example, the card table 630 may be implemented as an array of bytes, with each card being implemented as an individual byte in the array. A card corresponds to a segment, i.e., a range of addresses, of the heap 650. In this example, dirtying a card changes the value of the byte from a value that indicates the card is clean to a value that indicates the card is dirty.

In one or more embodiments, the detail card table 640 includes detail cards that are associated with the same heap segments as corresponding cards in the card table 630. For a particular card associated with a particular heap segment, the corresponding detail card includes bits associated with respective subsegments of that heap segment. For example, if a card is associated with a 512-byte heap segment, a corresponding detail card may include 8 bits associated with respective 64-byte heap subsegments. Dirtying a bit in a detail card indicates that the corresponding heap subsegment may include an intergenerational reference. The detail card table 640 provides additional granularity in determining parts of the heap 650 to scan for intergenerational references. The detail card table 640 may include an array of bytes corresponding to respective cards in the card table 630. Thus, the size of the detail card table 640 may be equal to the size of the card table 630. However, other types of data structures and configurations of the detail card table 640 are also within the scope of the present disclosure.

In some embodiments, the garbage collector 610 uses concurrent refinement threads to manage detail cards in the detail card table 640. Operations for concurrent refinement are discussed in further detail below with respect to FIG. 8.

Figure 7:
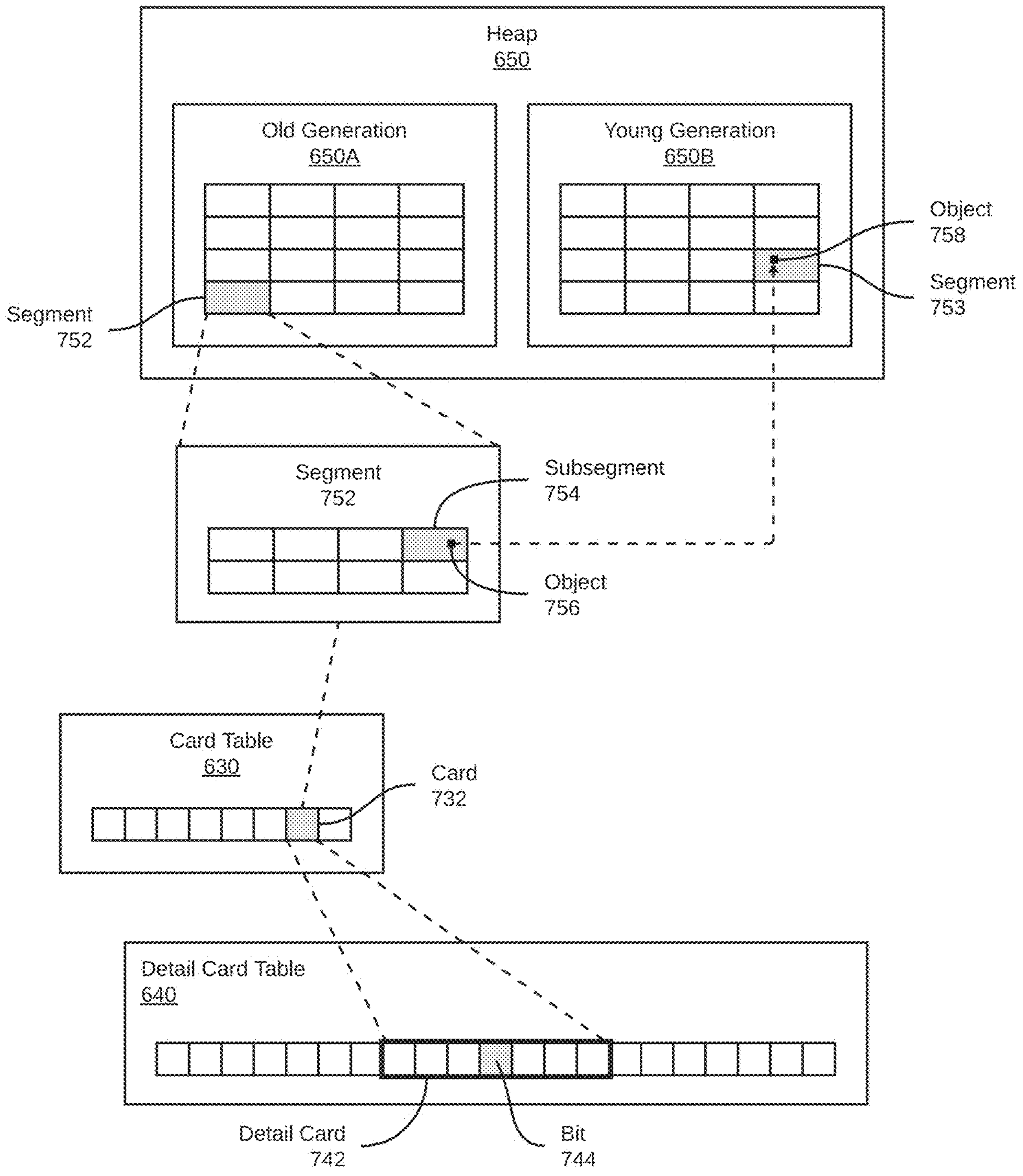
FIG. 7 illustrates a card table and a detail card table in accordance with one or more embodiments.

FIG. 7 illustrates the card table 630 and the detail card table 640 in accordance with one or more embodiments. In FIG. 7, a card 732 in the card table 630 is associated with a segment 752 of the heap 650. The corresponding detail card 640 in the detail card table 640 is associated with the same segment 752 and includes bits associated with respective subsegments of the segment 752. For example, bit 744 is associated with subsegment 754.

In this example, the heap 650 is logically divided into multiple generations including an old generation 650A and a young generation 650B. The garbage collector 610 may perform garbage collection on the young generation 650B at a higher frequency than on the old generation 650B.

In an embodiment, the generations 650A, 650B are logically divided into multiple segments such as segment 752. Segment 752 is further divided into multiple subsegments such as subsegment 754. For example, segment 752 may cover a range of memory addresses, and subsegment 754 of segment 752 may cover a subrange of memory addresses within that range of memory addresses.

The heap 650 may include the heap 530 of FIG. 5. The heap 650 is configured to store objects such as objects 534 of FIG. 5. In the example shown in FIG. 7, an object 756 is stored in subsegment 754 of a segment 752 of the old generation 650A, and another object 758 is stored in a segment 753 of the young generation 650B. Object 756 includes a reference to object 758.

In one or more embodiments, the card table 630 includes multiple cards such as card 732. Card 732 is associated with segment 752 of the heap 750. At runtime, when a mutator thread writes to an object field of the object 756, the write barrier 660 dirties the card 732 associated with the heap segment 752 that stores the object field of the object 756. During garbage collection, if card 732 is dirty, the garbage collector 610 scans heap segment 752 for potential young-to-old references that need to be updated when objects are evacuated from young generation 650B to old generation 650A.

In some embodiments, the detail card table 640 includes detail cards such as detail card 742 that are associated with the same heap segments as corresponding cards in the card table 630. For a particular card 732, the corresponding detail card 742 includes bits such as bit 744 that are associated with respective subsegments of the associated heap segment 752. For example, if heap segment 752 is 512 bytes, a bit 744 may be associated with a 64-bit subsegment 754. Examples of operations for using detail cards are discussed in further detail below with respect to FIGS. 8 and 9.

5. CONCURRENT REFINEMENT

Figure 8:
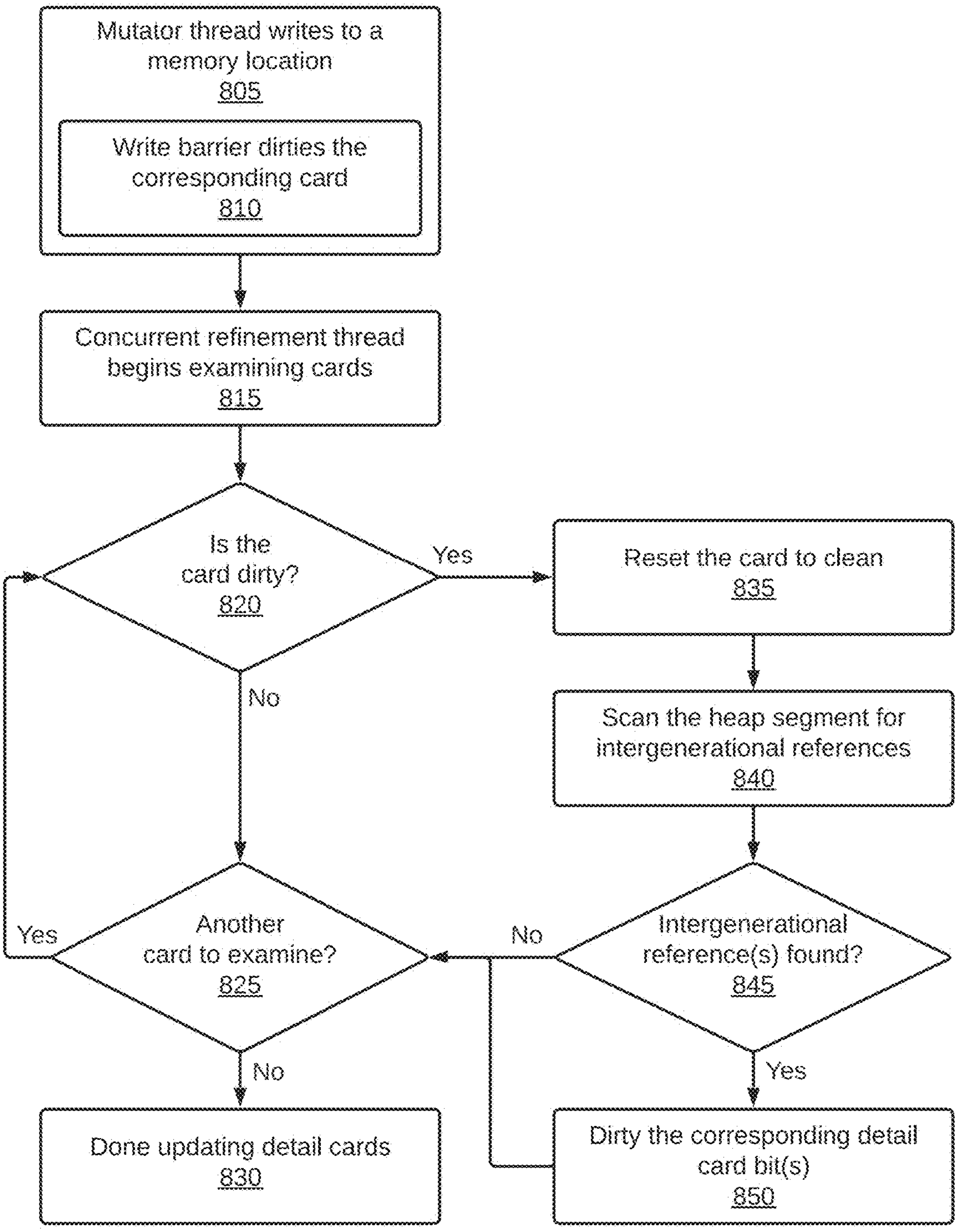
FIG. 8 illustrates an example set of operations for concurrent refinement in accordance with one or more embodiments.

FIG. 8 illustrates an example set of operations for concurrent refinement in accordance with one or more embodiments. One or more operations illustrated in FIG. 8 may be modified, rearranged, or omitted. Accordingly, the particular sequence of operations illustrated in FIG. 8 should not be construed as limiting the scope of one or more embodiments.

In one or more embodiments, a mutator thread writes an object to a memory location in the heap (Operation 805). For example, during execution of a software application, an application thread may instantiate and store an object at a location in the heap. In an embodiment, the object includes a reference to another object stored elsewhere in the heap. For example, the reference may be from an object in an older generation to another object in a younger generation.

In some embodiments, when the mutator thread writes an object to a memory location, a write barrier dirties the card that is associated with the segment of the heap to which the object was written (Operation 806). For example, referring to FIG. 7, in response to the mutator thread having written an object, the write barrier may dirty the corresponding card that is associated with the segment in which the object is stored.

In an embodiment, a concurrent refinement thread begins examining cards (Operation 815). Specifically, the concurrent refinement thread iterates over cards in the card table. The concurrent refinement thread executes concurrently with the mutator thread. For a given card, concurrent refinement determines if the card is dirty (Operation 820). For example, in an embodiment in which the card is a byte within the card table and dirtying the card involves dirtying the least significant bit in the byte, concurrent refinement checks the least significant bit in the byte to determine if the card has been dirtied.

In an embodiment, if the card is not dirty, concurrent refinement determines if the card table includes another card to examine (Operation 825). If there is another card to examine, concurrent refinement determines if the next card is dirty (Operation 820). If there are no more cards in the card table to examine, concurrent refinement is done updating detail cards (Operation 830).

In an embodiment, if Operation 820 determines that the card is dirty, concurrent refinement resets the card to clean (Operation 835). Resetting the card to clean allows for the possibility that a mutator thread may write to the corresponding heap segment after concurrent refinement has processed the card but before the next sweep cycle. As discussed below with respect to FIG. 9, if the card is dirty again at the next sweep cycle, the garbage collector may scan the entire heap segment.

In an embodiment, if the card is dirty, concurrent refinement scans the heap segment for intergenerational references (Operation 840). An intergenerational reference may be a reference to an object in the collection set. Concurrent refinement determines if any intergenerational references were found in the heap segment (Operation 845). If no intergenerational references were found, concurrent refinement determines if the card table includes another card to examine (Operation 825). If any intergenerational references were found, concurrent refinement dirties the corresponding detail card bit(s) (Operation 850). To dirty the corresponding detail card bit, concurrent refinement may modify a binary value of the bit such as changing the value of the bit from 0 to 1.

6. SWEEP CYCLE

Figure 9:
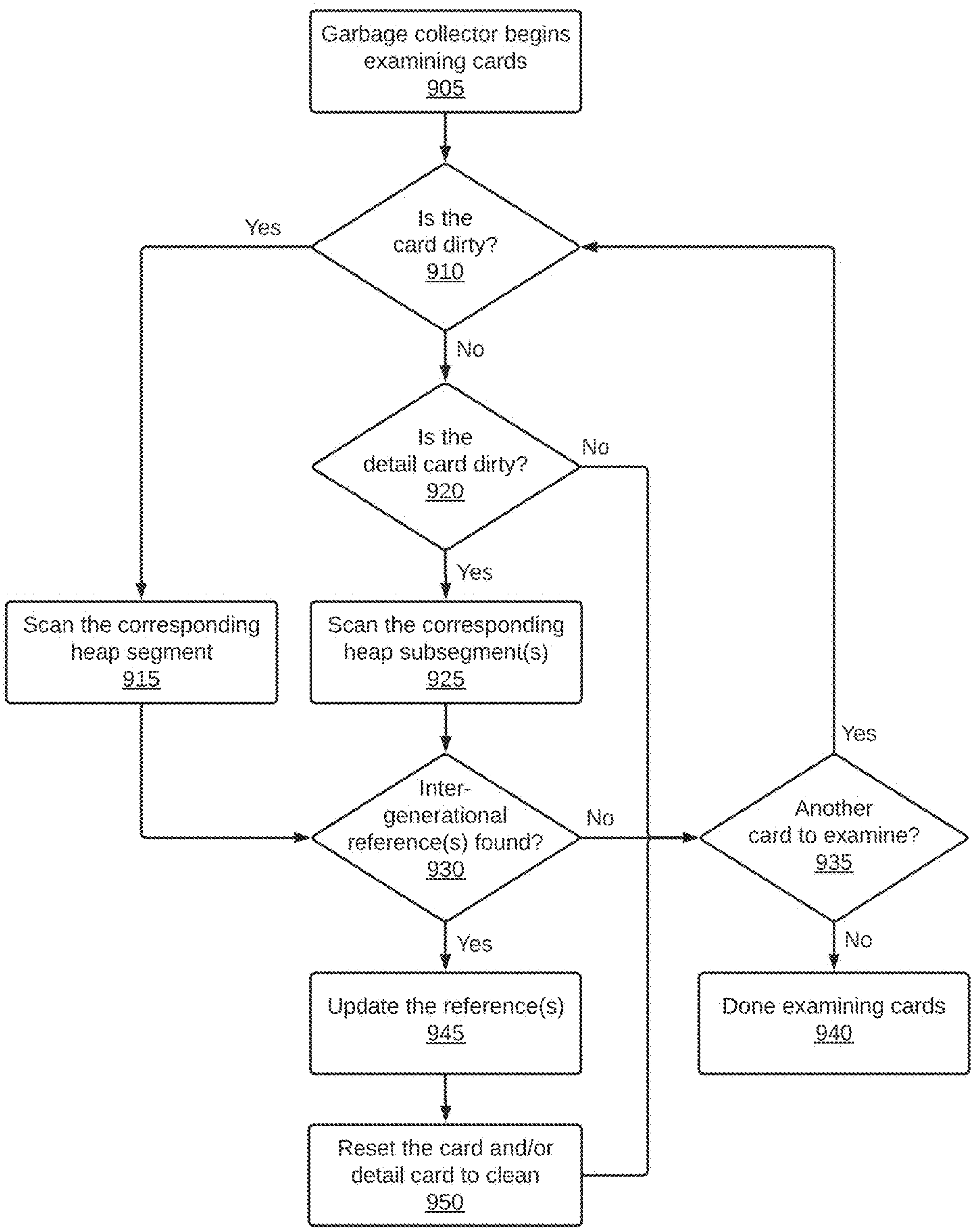
FIG. 9 illustrates an example set of operations for a sweep cycle in accordance with one or more embodiments.

FIG. 9 illustrates an example set of operations for a sweep cycle in accordance with one or more embodiments. One or more operations illustrated in FIG. 9 may be modified, rearranged, or omitted. Accordingly, the particular sequence of operations illustrated in FIG. 9 should not be construed as limiting the scope of one or more embodiments.

In an embodiment, the garbage collector begins examining cards (Operation 905). Specifically, the garbage collector iterates over cards in the card table. To execute the sweep cycle, the garbage collector may "stop the world," i.e., pause execution of the mutator thread. Pausing the mutator thread helps ensure that the mutator thread does not perform additional writes to the heap during the sweep cycle.

For a given card, the garbage collector determines if the card is dirty (Operation 910). For example, in an embodiment in which the card is a byte within the card table and dirtying the card involves dirtying the least significant bit in the byte, the garbage collector checks the least significant bit in the byte to determine if the card has been dirtied.

If the card is dirty, then either (a) concurrent refinement has not processed the card or (b) concurrent refinement processed the card but a mutator thread has since written to the corresponding heap segment. In either case, the detail card does not have information about the specific heap subsegment(s) to which data was written. Accordingly, the garbage collector scans the entire corresponding heap segment for intergenerational references (Operation 915).

In an embodiment, if Operation 910 determines that the card is not dirty, the garbage collector determines if the corresponding detail card is dirty (Operation 920), i.e., if the detail card includes one or more dirty bits. If the detail card is not dirty, the heap segment does not include any intergenerational references. The garbage collector refrains from scanning the heap segment for intergenerational references and determines if the card table includes another card to examine (Operation 935). If there is another card to examine, the garbage collector determines if the next card is dirty (Operation 910). If there are no more cards in the card table to examine, the garbage collector is done examining the cards for this sweep cycle (Operation 940).

In an embodiment, if Operation 920 determines that the detail card is dirty, the garbage collector scans the corresponding heap subsegment(s) for intergenerational references (Operation 925). Specifically, the garbage collector scans the heap subsegment(s) corresponding to dirty bits in the detail card without scanning heap subsegments corresponding to clean bits in the detail card.

In an embodiment, to perform Operations 910 and 920, the garbage collector merges values in the card table with values in the associated detail card table. In addition to each bit in a detail card being either clean or dirty, the detail card itself has a value. For example, a detail card may be a byte where for a given bit, 0 means that the bit is clean and 1 means that the bit is dirty. Thus, a detail card with the value 00010001 indicates that the bits in positions 4 and 8 are dirty, i.e., the corresponding heap subsegments may include intergenerational references. The byte itself has a value of $2^0+2^4=17$. The detail card table can be viewed as an array of byte values from 0 (all bits are clean) to 255 (all bits are dirty). Similarly, the associated card may have a value of 0 or x, where 0 indicates that the card is clean and x indicates that the card is dirty. The card table can be viewed as an array of byte values of either 0 (the card is clean) or x (the card is dirty). In an embodiment, x is the maximum possible value of the detail card, e.g., 255 if the detail card is 8 bits, because a detail card having all dirty bits would also require scanning the entire heap segment. To merge the card table and the detail card table, the garbage collector may perform a logical OR operation on the two binary-encoded values.

As an example, during a sweep cycle, a card table may have the following values:

x0xx000x

The associated detail card table may have the following values:

000a00b0

Merging the card table and the detail card table yields the following merged table:

x0xx00bx

For a given position in the merged table, if the value is 0, the garbage collector does not scan the heap segment. If the value is x, the garbage collector scans the entire heap segment. If the value is a non-zero value other than x, the garbage collector uses the detail information to determine which heap subsegment(s) to scan.

In an embodiment, when scanning either the entire heap segment (Operation 915) or one or more heap subsegments (Operation 925), the garbage collector determines if any intergenerational references were found (Operation 930). Specifically, the garbage collector determines if any intergenerational references to objects in the collection set were found. If no intergenerational references to objects in the collection set were found, the garbage collector determines if the card table includes another card to examine (Operation 935). If an intergenerational reference to an object in the collection set was found, the garbage collector updates the reference to reflect the new location of the object (Operation 945). The garbage collector then resets the card and detail card to clean (Operation 950) and determines if the card table includes another card to examine (Operation 935).

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
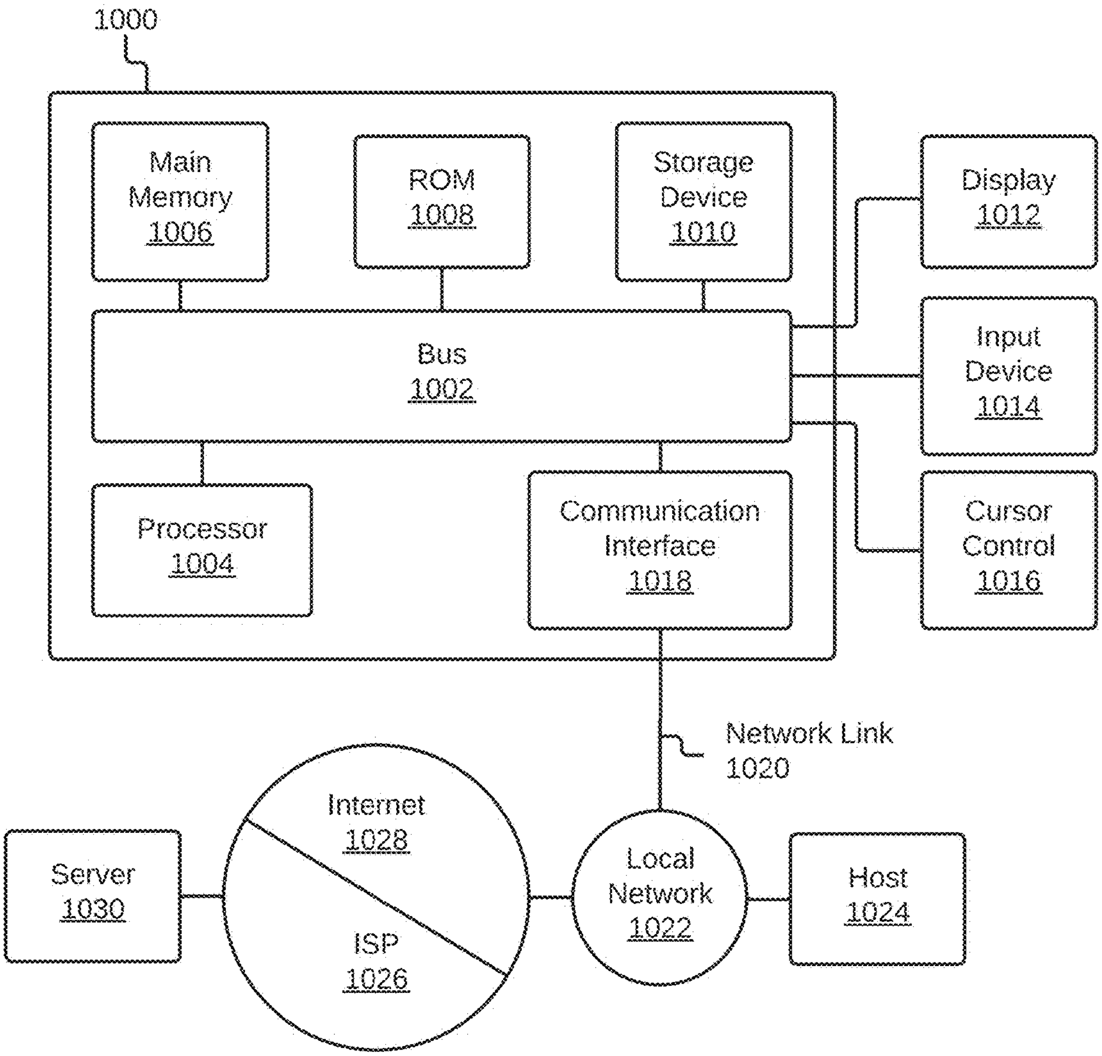
FIG. 10 shows a block diagram that illustrates a computer system in accordance with one or more embodiments.

For example, FIG. 10 is a block diagram that illustrates a computer system 1000 upon which an embodiment of the disclosure may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions included in main memory 1006. Such instructions may be read into main memory 1006 from another storage medium, such as storage device 1010. Execution of the sequences of instructions included in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 928. Local network 1022 and Internet 928 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 928, ISP 1026, local network 1022 and communication interface 1018.

The received code may be executed by processor 1004 as it is received, and/or stored in storage device 1010, or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium includes instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:

marking, by a garbage collector executing in a runtime environment, a first bit in a first plurality of bits of a first detail card as dirty;

wherein a first card in a plurality of cards of a card table is associated with a first heap segment in a plurality of heap segments;

wherein the first plurality of bits of the first detail card are associated, respectively, with a first plurality of heap subsegments of the first heap segment; and wherein the first bit is associated with a first heap subsegment in the first plurality of heap subsegments;

determining, by the garbage collector during a sweep cycle, that (a) the first card is clean, (b) the first bit is dirty, and (c) a second bit in the first plurality of bits, associated with a second heap subsegment in the first plurality of heap subsegments, is clean; and based on the first card being clean, the first bit being dirty, and the second bit being clean:

scanning, by the garbage collector during the sweep cycle, the first heap subsegment for intergenerational references; and refraining from scanning, by the garbage collector during the sweep cycle, the second heap subsegment for intergenerational references;

wherein the method is performed by at least one device including a hardware processor.

2. The method of claim 1, further comprising:

determining, by the garbage collector, that a second card in the plurality of cards is dirty;

wherein the second card is associated with a second heap segment of the plurality of heap segments;

wherein a second plurality of bits of a second detail card are associated, respectively, with a second plurality of heap subsegments of the second heap segment;

based on determining that the second card is dirty: scanning, by the garbage collector, the second heap segment for intergenerational references regardless of values of the second plurality of bits.

3. The method of claim 1, further comprising:

determining, by the garbage collector, that (a) a second card in the plurality of cards, associated with a second heap segment in the plurality of heap segments, is clean, and (b) a second plurality of bits of a second detail card, associated with the second heap segment, are clean; and based on determining that the second card is clean and the second plurality of bits are clean: refraining from scanning, by the garbage collector, the second heap segment for intergenerational references.

4. The method of claim 1, wherein marking the first bit as dirty is performed by a concurrent refinement thread of the garbage collector that executes concurrently with a mutator thread.

5. The method of claim 4, further comprising:

determining, by the concurrent refinement thread before the sweep cycle, that the first card is dirty;

responsive to determining that the first card is dirty:

marking, by the concurrent refinement thread, the first card as clean; and scanning, by the concurrent refinement thread, the first heap segment for intergenerational references;

wherein marking the first bit as dirty is performed responsive to the scanning determining that the first heap subsegment comprises an intergenerational reference.

6. The method of claim 1, wherein a first memory size of the first detail card is equal to a second memory size of the first card.

7. The method of claim 1, further comprising:

generating, by the garbage collector, a merged table comprising a plurality of merged values based on respective values of the plurality of cards and associated detail cards in a plurality of detail cards;

wherein determining that (a) the first card is clean, (b) the first bit is dirty, and (c) the second bit is clean is based at least in part on a first merged value, in the plurality of merged values, associated with the first heap segment.

8. One or more non-transitory computer-readable media storing instructions that, when executed by one or more hardware processors, cause performance of operations comprising:

marking, by a garbage collector executing in a runtime environment, a first bit in a first plurality of bits of a first detail card as dirty;

wherein a first card in a plurality of cards of a card table is associated with a first heap segment in a plurality of heap segments;

wherein the first plurality of bits of the first detail card are associated, respectively, with a first plurality of heap subsegments of the first heap segment; and wherein the first bit is associated with a first heap subsegment in the first plurality of heap subsegments;

determining, by the garbage collector during a sweep cycle, that (a) the first card is clean, (b) the first bit is dirty, and (c) a second bit in the first plurality of bits, associated with a second heap subsegment in the first plurality of heap subsegments, is clean; and based on the first card being clean, the first bit being dirty, and the second bit being clean:

scanning, by the garbage collector during the sweep cycle, the first heap subsegment for intergenerational references; and refraining from scanning, by the garbage collector during the sweep cycle, the second heap subsegment for intergenerational references.

9. The one or more non-transistory computer-readable media of claim 8, the operations further comprising:

determining, by the garbage collector, that a second card in the plurality of cards is dirty;

wherein the second card is associated with a second heap segment of the plurality of heap segments;

wherein a second plurality of bits of a second detail card are associated, respectively, with a second plurality of heap subsegments of the second heap segment;

based on determining that the second card is dirty: scanning, by the garbage collector, the second heap segment for intergenerational references regardless of values of the second plurality of bits.

10. The one or more non-transistory computer-readable media of claim 8, the operations further comprising:

determining, by the garbage collector, that (a) a second card in the plurality of cards, associated with a second heap segment in the plurality of heap segments, is clean, and (b) a second plurality of bits of a second detail card, associated with the second heap segment, are clean; and based on determining that the second card is clean and the second plurality of bits are clean: refraining from scanning, by the garbage collector, the second heap segment for intergenerational references.

11. The one or more non-transistory computer-readable media of claim 8, wherein marking the first bit as dirty is performed by a concurrent refinement thread of the garbage collector that executes concurrently with a mutator thread.

12. The one or more non-transistory computer-readable media of claim 11, the operations further comprising:

determining, by the concurrent refinement thread before the sweep cycle, that the first card is dirty;

responsive to determining that the first card is dirty:

marking, by the concurrent refinement thread, the first card as clean; and scanning, by the concurrent refinement thread, the first heap segment for intergenerational references;

wherein marking the first bit as dirty is performed responsive to the scanning determining that the first heap subsegment comprises an intergenerational reference.

13. The one or more non-transistory computer-readable media of claim 8, wherein a first memory size of the first detail card is equal to a second memory size of the first card.

14. The one or more non-transistory computer-readable media of claim 8, the operations further comprising:

generating, by the garbage collector, a merged table comprising a plurality of merged values based on respective values of the plurality of cards and associated detail cards in a plurality of detail cards;

wherein determining that (a) the first card is clean, (b) the first bit is dirty, and (c) the second bit is clean is based at least in part on a first merged value, in the plurality of merged values, associated with the first heap segment.

15. A system comprising:

at least one device including a hardware processor;

the system being configured to perform operations comprising:

marking, by a garbage collector executing in a runtime environment, a first bit in a first plurality of bits of a first detail card as dirty;

wherein a first card in a plurality of cards of a card table is associated with a first heap segment in a plurality of heap segments;

wherein the first plurality of bits of the first detail card are associated, respectively, with a first plurality of heap subsegments of the first heap segment; and wherein the first bit is associated with a first heap subsegment in the first plurality of heap subsegments;

determining, by the garbage collector during a sweep cycle, that (a) the first card is clean, (b) the first bit is dirty, and (c) a second bit in the first plurality of bits, associated with a second heap subsegment in the first plurality of heap subsegments, is clean; and based on the first card being clean, the first bit being dirty, and the second bit being clean:

scanning, by the garbage collector during the sweep cycle, the first heap subsegment for intergenerational references; and refraining from scanning, by the garbage collector during the sweep cycle, the second heap subsegment for intergenerational references.

16. The system of claim 15, the operations further comprising:

determining, by the garbage collector, that a second card in the plurality of cards is dirty;

wherein the second card is associated with a second heap segment of the plurality of heap segments;

wherein a second plurality of bits of a second detail card are associated, respectively, with a second plurality of heap subsegments of the second heap segment;

based on determining that the second card is dirty: scanning, by the garbage collector, the second heap segment for intergenerational references regardless of values of the second plurality of bits.

17. The system of claim 15, the operations further comprising:

determining, by the garbage collector, that (a) a second card in the plurality of cards, associated with a second heap segment in the plurality of heap segments, is clean, and (b) a second plurality of bits of a second detail card, associated with the second heap segment, are clean; and based on determining that the second card is clean and the second plurality of bits are clean: refraining from scanning, by the garbage collector, the second heap segment for intergenerational references.

18. The system of claim 15, wherein marking the first bit as dirty is performed by a concurrent refinement thread of the garbage collector that executes concurrently with a mutator thread.

19. The system of claim 18, the operations further comprising:

determining, by the concurrent refinement thread before the sweep cycle, that the first card is dirty;

responsive to determining that the first card is dirty:

marking, by the concurrent refinement thread, the first card as clean; and scanning, by the concurrent refinement thread, the first heap segment for intergenerational references;

wherein marking the first bit as dirty is performed responsive to the scanning determining that the first heap subsegment comprises an intergenerational reference.

20. The system of claim 15, the operations further comprising:

generating, by the garbage collector, a merged table comprising a plurality of merged values based on respective values of the plurality of cards and associated detail cards in a plurality of detail cards;

wherein determining that (a) the first card is clean, (b) the first bit is dirty, and (c) the second bit is clean is based at least in part on a first merged value, in the plurality of merged values, associated with the first heap segment.

* * * * *